Patented Aug. 17, 1926.

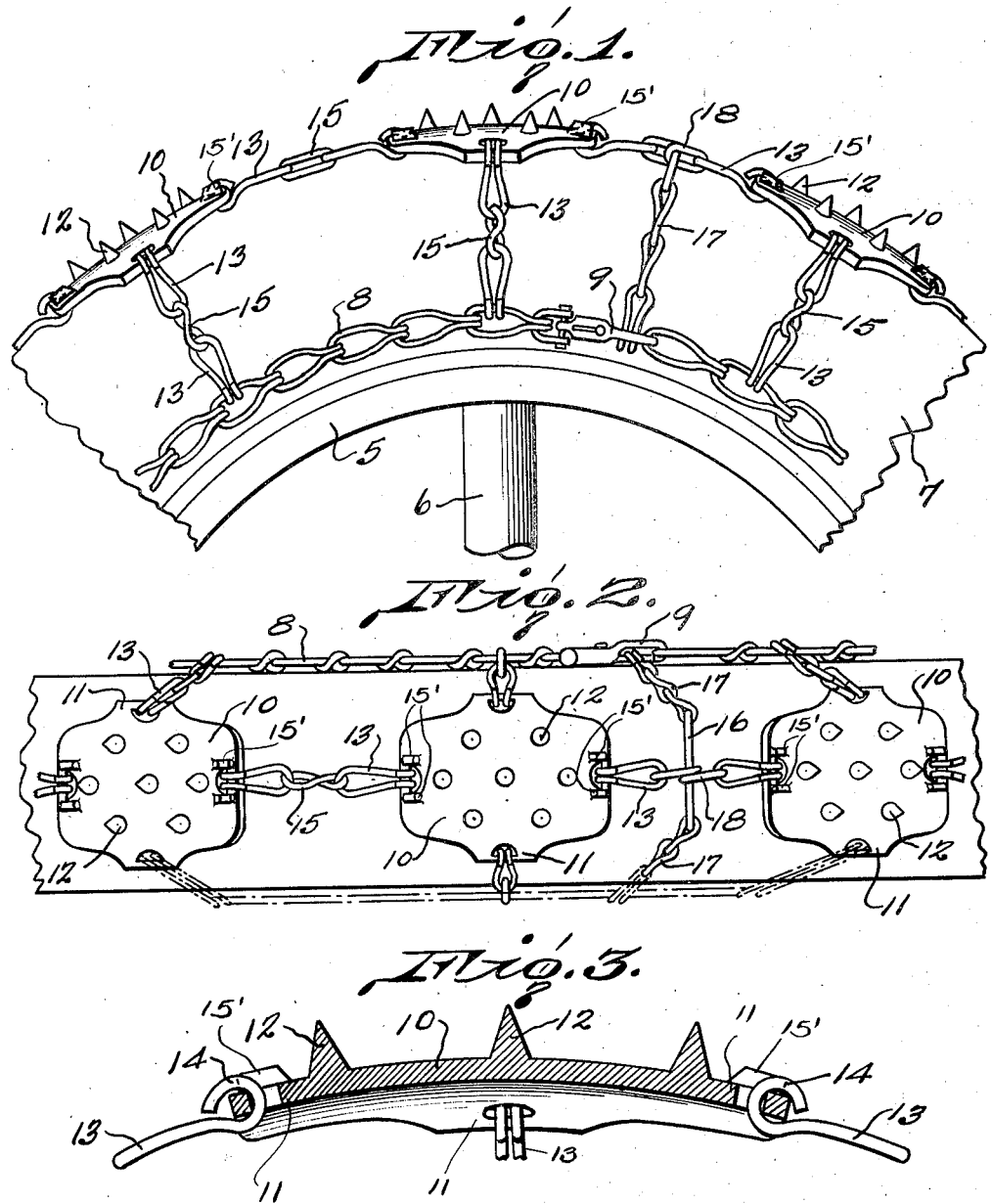

1,596,633

UNITED STATES PATENT OFFICE.

HERBERT L. SMALL, OF AUBURN, MAINE.

ANTISKID DEVICE.

Application filed October 26, 1925. Serial No. 64,864.

This invention relates to improvements in anti-skidding apparatus particularly adaptable upon automobiles and similar vehicles.

An important object of the invention is to provide a device of the above character which may be readily mounted upon vehicle wheels and materially reduce the possibility of skidding or sliding movement thereof.

A further object of the invention is to provide an anti-skidding device of novel construction designed to permit convenient attachment and removal and which may be readily interchanged.

A still further object of the invention is the provision of an anti-skidding device of the above type of comparatively simple and durable construction and constructed so as to be manufactured at a reasonable cost.

Other objects and advantages of the invention will become apparent as the description progresses.

In the accompanying drawings forming a part of this specification and in which like numerals are employed to designate corresponding parts throughout the same:

Figure 1 is a fragmentary side elevation of a vehicle wheel showing my improved apparatus mounted in association therewith.

Figure 2 is a top plan view of the same, and

Figure 3 is a longitudinal sectional view taken through the center of the device embodying my invention.

In the drawings, wherein for the purpose of illustration is shown the preferred embodiment of my invention, the numeral 5 generally designates the felly portion of a conventional type of vehicle wheel structure, 6 one of the spokes thereof, and 7 a common form of pneumatic tire mounted thereon. As is well known to those familiar with this art, it is customary to provide apparatus to be detachably mounted in association with the wheels of automobiles and similar vehicles, particularly the traction wheels, to prevent spinning and skidding of these members. Numerous devices are now upon the market for this purpose, the most popular type embodying an anti-skid chain apparatus composed of a pair of circumferential side chains carrying, at intervals, a plurality of transversely extending chains extending over the tread of the tire. These attachments, used extensively upon rain or snow-covered roadways, do not entirely overcome the slipping tendency of the traction wheels, and with this in mind, my invention relates to an improved apparatus adapted to materially increase the traction efficiency of vehicle wheels under these conditions.

Referring, now more particularly to the structure embodying my invention, the numeral 8 designates a conventional type of circumferential side chains, two of which are employed in connection with my apparatus, disposed on the side walls of a tire adjacent the wheel felly. These side chains, which may be of any well known construction, are positioned in opposite relation adjacent the side walls of the tire and are connected in continuous formation by means of snap fasteners 9, intended to permit convenient attachment or removal of the apparatus.

In carrying out my invention, I contemplate the provision of a series of ground engaging members arranged in spaced relation upon the tread portion of the tire, the contacting faces of these members being provided with means for positively gripping the ground and thus prevent sliding or spinning movement of the wheels. These plate members embody a substantially rectangular tread plate 10 provided on the longitudinal edges with oppositely disposed apertured ears 11. These tread plates 10 are curved so as to conform to the curvature of the tire tread and are positioned centrally upon the tread. The outer ground engaging faces of the tread plates are provided with a plurality of tapered projections or studs 12, pointed at their outer extremities for positive engagement with the roadway. As will be readily observed with reference to the drawings, it will be seen that the tread plates and studs are preferably of integral construction, constructed of durable metal in order to withstand the severe usage of this type of apparatus.

Means are provided for interchangeably securing the tread plates in position upon the tire tread, this being accomplished by a series of short chain sections extending longitudinally between the plates and connected to the adjacent transverse side and, likewise, secured to the ears 11 formed on the longitudinal edges for connection with the circumferential side chains 8. These comparatively short chain sections are preferably equal in length so that the longitudinal and side chains are readily interchangeable. Each of these chain sections embodies a pair of substantially U-shaped fastening elements 13, the extremities being bent to provide hooks 14 engageable with apertures formed in the tread plates, while the adjacent rounded portions are connected by a twisted link 15. While this connecting link 15 has been shown and described as of twisted formation in order to reduce the contact surface and prolong the life of the chain sections, it is conceivable that these members may be of the straight link type where it is desirable to provide a cheaper construction. This construction readily permits replacement of the short connecting chain sections, the longitudinal sections being interchanged with the side sections when it is apparent that these members are becoming worn, obviously the longitudinal sections being in frequent contact with the ground will become worn much sooner than the side sections, and the replacement of these members will naturally prolong the life of the apparatus.

Arranged on each tread plate on each side of the apertures where the longitudinal chain sections are attached are provided upstanding lugs 15' for engaging the roadway to eliminate excessive wear on the fastening elements 13 of the longitudinal chain sections, and thus prolong the life of said fastening elements. The lugs 15' are of elongated formation and extend longitudinally of the apparatus so as to also aid in eliminating side skidding of a tire upon which my improved apparatus is applied.

In order that the apparatus may be conveniently attached in position upon or removed from the tire, it is essential that means be provided for readily disconnecting the chains, this being accomplished, in the present instance, by the provision of a transverse bar 16 looped at its extremities and carrying transversely extending chain sections 17 preferably formed of twisted links. The lower extremities of these side sections 17 carry a U-shaped fastening element 13 which engages the side chain snap fasteners 9. Connected to the central portion of the transverse bar 16 are a pair of straight link sections 18, the apparatus being disconnected at this point by removal of the adjacent fastening elements from the tread plate. With this arrangement, the apparatus may be very easily mounted upon the tire and connected snugly in position thereon, thus obviating the possibility of accidental loss of the chain.

It is readily apparent from the foregoing description that a novel and efficient anti-skidding apparatus is provided. As previously intimated an important feature of the construction is to provide an apparatus of this type designed to provide means for positively engaging the roadway and at the same time permit sale of the apparatus at a reasonable cost. With reference to the formation of the pointed projections or studs 12, it is to be noted that these members may be formed in various lengths so that the apparatus may be applicable to the particular use of the vehicle. Where the vehicle is to be driven upon the paved streets of the city, these studs may be of comparatively short construction while various forms of the apparatus intended for use upon unpaved roads would permit more efficient operation of the vehicle when equipped with a stud of longer construction so as to increase the efficiency of the traction wheels.

It is to be understood that the form of my invention herewith shown and described is to be taken as the preferred example of the same, and that various changes as to the shape, size, and arrangement of parts may be resorted to without departing from the spirit of the invention or the scope of the subjoined claim.

Having thus described my invention, I claim:

An anti-skid device comprising a tread plate provided with openings adjacent its edges, chain sections including fastening elements engaging through the openings in said plate, and upstanding lugs located upon the outer face of said plate at the side edges of said openings for eliminating wear upon the fastening elements of said connecting chain sections.

In testimony whereof, I have affixed my signature.

HERBERT L. SMALL.